US012234110B2

(12) United States Patent
Harmon

(10) Patent No.: US 12,234,110 B2
(45) Date of Patent: Feb. 25, 2025

(54) PNEUMATIC CONVEYANCE LEVELING SYSTEM

(71) Applicant: Deere & Company, Moline, IL (US)

(72) Inventor: Andrew W. Harmon, Geneseo, IL (US)

(73) Assignee: DEERE & COMPANY, Moline, IL (US)

(*) Notice: Subject to any disclaimer, the term of this patent is extended or adjusted under 35 U.S.C. 154(b) by 255 days.

(21) Appl. No.: 17/872,427

(22) Filed: Jul. 25, 2022

(65) Prior Publication Data

US 2024/0025676 A1 Jan. 25, 2024

(51) Int. Cl.
| A01C 15/00 | (2006.01) |
| A01C 7/08 | (2006.01) |
| B65G 65/28 | (2006.01) |
| B65G 65/30 | (2006.01) |
| B65G 69/04 | (2006.01) |

(52) U.S. Cl.
CPC .............. *B65G 65/30* (2013.01); *A01C 7/081* (2013.01); *A01C 15/003* (2013.01); *B65G 65/28* (2013.01); *B65G 69/0441* (2013.01)

(58) Field of Classification Search
None
See application file for complete search history.

(56) References Cited

U.S. PATENT DOCUMENTS

| 2,743,965 A | 5/1956 | Mattson |
| 4,284,372 A | 8/1981 | Smith |
| 5,575,225 A * | 11/1996 | Smith ................. A01C 15/003 111/925 |
| 6,047,652 A * | 4/2000 | Prairie .................. A01C 7/081 406/146 |
| 6,598,548 B2 | 7/2003 | Lempriere |
| 6,668,738 B2 | 12/2003 | Lee et al. |

(Continued)

FOREIGN PATENT DOCUMENTS

CA 2938500 A1 10/2017

OTHER PUBLICATIONS

Extended European Search Report and Written Opinion issued in European Patent Application No. 23181237.1, dated Jan. 2, 2024, in 10 pages.

*Primary Examiner* — Joseph A Dillon, Jr.
(74) *Attorney, Agent, or Firm* — Taft Stettinius & Hollister LLP; Stephen F. Rost

(57) ABSTRACT

An exemplary system for filling a holding tank with agricultural product generally includes a supply line. The supply line includes an inlet, a plurality of outlets, and a plurality of junctions. The inlet is connected with a conveyance device such that the supply line is operable to receive a flowing agricultural product blown by the conveyance device. The outlets are open to a holding space of the holding tank, and includes a first outlet and a second outlet. The plurality of junctions includes a first junction associated with the first outlet, and a second junction associated with the second outlet. The first junction is configured to direct agricultural product to flow out of the first outlet until the first outlet becomes blocked, and to thereafter direct agricultural product to flow toward the second junction. The second junction is configured to direct agricultural product to flow out of the second outlet.

19 Claims, 5 Drawing Sheets

(56) References Cited

U.S. PATENT DOCUMENTS

| | | | |
|---|---|---|---|
| 6,782,835 B2* | 8/2004 | Lee | A01C 7/081 111/175 |
| 7,743,719 B2* | 6/2010 | Memory | A01C 7/102 111/175 |
| 7,966,954 B2* | 6/2011 | Anderson | A01C 7/082 111/175 |
| 8,079,317 B2* | 12/2011 | Anderson | A01C 7/082 111/175 |
| 8,276,530 B2* | 10/2012 | Anderson | A01C 7/082 111/175 |
| 8,770,120 B2* | 7/2014 | Naylor | A01C 7/082 111/175 |
| 9,725,254 B2 | 8/2017 | Roberge et al. | |
| 9,738,200 B2 | 8/2017 | Roberge et al. | |
| 9,826,626 B2 | 11/2017 | Myeong et al. | |
| 9,907,224 B2 | 3/2018 | Rosengren et al. | |
| 9,950,876 B2 | 4/2018 | Roberge et al. | |
| 10,918,010 B2* | 2/2021 | Gervais | A01C 7/042 |
| 11,358,785 B2* | 6/2022 | Gathman | B65D 88/30 |
| 11,980,120 B2* | 5/2024 | Kowalchuk | A01C 15/006 |
| 2003/0177967 A1* | 9/2003 | Lee | A01C 7/042 111/175 |
| 2003/0177970 A1 | 9/2003 | Lee et al. | |
| 2016/0120100 A1 | 5/2016 | Thompson et al. | |
| 2019/0090416 A1 | 3/2019 | Schembri et al. | |
| 2023/0309438 A1* | 10/2023 | Karlsson | A01C 7/081 111/174 |
| 2023/0380331 A1* | 11/2023 | Thompson | A01C 7/06 |

* cited by examiner

PNEUMATIC CONVEYANCE LEVELING SYSTEM

TECHNICAL FIELD

The present disclosure generally relates to systems and methods for conveying and leveling a granular commodity, and more particularly but not exclusively relates to systems and methods for conveying and leveling granular agricultural product, such as seed and/or fertilizer.

BACKGROUND

Mobile agricultural equipment commonly stores granular agricultural product (e.g., seed, pesticide, and/or fertilizer) in a reservoir or holding tank. However, if the reservoir or holding tank is not filled relatively evenly, complications may arise. For example, if a reservoir or holding tank with multiple outlets is not leveled, the outlets may stop receiving grain at different times, resulting in some outlets receiving no product while others continue to receive product. For these reasons among others, there remains a need for further improvements in this technological field.

SUMMARY

Certain embodiments of the present application relate to a method of filling a holding tank with agricultural product, the method comprising: flowing agricultural product into a supply line comprising a plurality of outlets open to a holding space of the holding tank, the plurality of outlets including a first outlet associated with a first junction, and a second outlet associated with a second junction; flowing agricultural product through the first junction, wherein the first junction directs agricultural product to flow out of the first outlet until the first outlet becomes blocked, and thereafter directs agricultural product to flow toward the second junction; and with the first outlet blocked, flowing agricultural product through the first junction toward the second junction, wherein the second junction directs agricultural product to flow out of the second outlet.

In certain embodiments, agricultural product flowing out of the first outlet forms a first pile; wherein agricultural product flowing out of the second outlet forms a second pile; and wherein the method further comprises stopping flow of agricultural product in response to the second pile reaching a predetermined height.

In certain embodiments, the first outlet is upstream of the second outlet.

In certain embodiments, the first junction is a Y-shaped junction.

In certain embodiments, the Y-shaped junction comprises: an inlet branch; a first outlet branch leading toward the first outlet; and a second outlet branch leading toward the second junction; wherein the inlet branch is angled and/or curved toward the first outlet branch.

In certain embodiments, the plurality of outlets further comprises an intermediate outlet positioned between the first outlet and the second outlet; wherein the intermediate outlet is associated with an intermediate junction; wherein flowing agricultural product through the first junction toward the second junction comprises flowing agricultural product through the intermediate junction; and wherein the intermediate junction directs agricultural product to flow out of the intermediate outlet until the intermediate outlet becomes blocked, and thereafter directs agricultural product to flow toward the second junction.

In certain embodiments, the plurality of outlets further comprises a final outlet positioned downstream of the second outlet; wherein the final outlet is associated with a final junction; and wherein the second junction directs agricultural product to flow out of the second outlet until the second outlet becomes blocked, and thereafter directs agricultural product to flow toward the final junction.

In certain embodiments, the second outlet is a final outlet of the supply line.

Certain embodiments of the present application relate to a system for filling a holding tank with agricultural product, the system comprising: a supply line comprising: an inlet connected with a conveyance device such that the supply line is operable to receive a flowing agricultural product conveyed by the conveyance device; a plurality of outlets open to a holding space of the holding tank, the plurality of outlets comprising a first outlet and a second outlet; and a plurality of junctions, each junction associated with a corresponding outlet of the plurality of outlets, the plurality of junctions comprising a first junction associated with the first outlet, and a second junction associated with the second outlet; wherein the first junction is configured to direct agricultural product to flow out of the first outlet until the first outlet becomes blocked, and to thereafter direct agricultural product to flow toward the second junction; and wherein the second junction is configured to direct agricultural product to flow out of the second outlet.

In certain embodiments, the system further comprises a sensor configured to sense when a pile of agricultural product below the second outlet reaches a predetermined height.

In certain embodiments, the system further comprises the conveyance device and a controller connected with the conveyance device and the sensor; wherein the conveyance device comprises a blower and/or a meter; and wherein the controller is configured to cease operation of the conveyance device based upon information generated by the sensor.

In certain embodiments, the first junction is a Y-shaped junction.

In certain embodiments, the Y-shaped junction comprises an inlet branch, a first outlet branch leading toward the first outlet, and a second outlet branch leading toward the second junction; and wherein the inlet branch is configured to direct agricultural product toward the first outlet branch until the first outlet becomes blocked.

In certain embodiments, the system further comprises a vent positioned downstream of the first outlet.

In certain embodiments, the vent is connected with the second junction.

Certain embodiments of the present application relate to mobile agricultural equipment comprising the system.

In certain embodiments, the mobile agricultural equipment further comprises a first vehicle comprising: a plurality of row units; the holding tank, wherein the holding tank is connected with the plurality of row units; and the system; and wherein each of the row units is configured to distribute agricultural product from the holding tank to ground.

In certain embodiments, the mobile agricultural equipment further comprises a second vehicle connected with the first vehicle; wherein the second vehicle comprises a reservoir of agricultural product; and wherein the conveyance device is configured to convey agricultural product from the reservoir toward the supply line.

In certain embodiments, the mobile agricultural equipment further comprises a plurality of distribution outlets, wherein each distribution outlet leads from the holding tank to a corresponding row unit of the plurality of row units.

Certain embodiments of the present application relate to a method of filling a holding tank with agricultural product [390], the method comprising: flowing agricultural product into a supply line comprising a plurality of outlets open to a holding space of the holding tank [300], the plurality of outlets including a first outlet [312a] associated with a first junction [316a], and a second outlet [312d] associated with a second junction [316']; flowing agricultural product through the first junction [316a], wherein the first junction [316a] directs agricultural product to flow out of the first outlet [312a] until the first outlet [312a] becomes blocked, and thereafter directs agricultural product [390] to flow toward the second junction [316']; and with the first outlet [312a] blocked, flowing agricultural product through the first junction [316a] toward the second junction [316'], wherein the second junction [316'] directs agricultural product to flow out of the second outlet [312d].

In certain embodiments, agricultural product flowing out of the first outlet [312a] forms a first pile [391]; wherein agricultural product flowing out of the second outlet [312d] forms a second pile [394]; and wherein the method further comprises stopping flow of agricultural product in response to the second pile reaching a predetermined height.

In certain embodiments, the first junction [316a] comprises a Y-shaped junction [317]; wherein the Y-shaped junction comprises: an inlet branch [317a]; a first outlet branch [317c] leading toward the first outlet [312a]; and a second outlet branch [317b] leading toward the second junction [316']; and wherein the inlet branch [317a] is angled and/or curved toward the first outlet branch [317c].

In certain embodiments, the plurality of outlets further comprises an intermediate outlet [312b] positioned between the first outlet [312a] and the second outlet [312d]; wherein the intermediate outlet [312b] is associated with an intermediate junction [316b]; wherein flowing agricultural product through the first junction [316a] toward the second junction [316'] comprises flowing agricultural product through the intermediate junction [316b]; and wherein the intermediate junction [316b] directs agricultural product to flow out of the intermediate outlet [312b] until the intermediate outlet [312b] becomes blocked, and thereafter directs agricultural product to flow toward the second junction [316'].

In certain embodiments, the second outlet [312d] is a final outlet of the supply line [310].

Certain embodiments of the present application relate to a system [100'] for filling a holding tank with agricultural product [390], the system [100'] comprising: a supply line [310] comprising: an inlet connected with a conveyance device [121, 123] such that the supply line is operable to receive a flowing agricultural product blown by the conveyance device [121, 123]; a plurality of outlets open to a holding space of the holding tank [300], the plurality of outlets comprising a first outlet [312a] and a second outlet [312d]; a plurality of junctions [316], each junction [316a, 316b] associated with a corresponding outlet [312a, 312b] of the plurality of outlets [312], the plurality of junctions comprising a first junction [316a] associated with the first outlet [312a], and a second junction [316'] associated with the second outlet [312d]; wherein the first junction [316a] is configured to direct agricultural product to flow out of the first outlet [312a] until the first outlet [312a] becomes blocked, and to thereafter direct agricultural product to flow toward the second junction [316']; and wherein the second junction [316'] is configured to direct agricultural product to flow out of the second outlet [312d].

In certain embodiments, the system further comprises a sensor configured to sense when a pile of agricultural product below the second outlet [312d] reaches a predetermined height.

In certain embodiments, the system further comprises the conveyance device [121, 123] and a controller connected with the conveyance device [121, 123] and the sensor [330]; wherein the conveyance device includes a blower and/or a meter [123]; and wherein the controller is configured to cease operation of the conveyance device [121, 123] based upon information generated by the sensor [330].

In certain embodiments, the first junction [316a] is a Y-shaped junction [317].

In certain embodiments, the Y-shaped junction comprises an inlet branch [317a], a first outlet branch [317c] leading toward the first outlet [312a], and a second outlet branch [317b] leading toward the second junction [316']; and wherein the inlet branch [317a] is configured to direct agricultural product toward the first outlet branch [317c] until the first outlet [312a] becomes blocked.

In certain embodiments, the system further comprises a vent positioned downstream of the first outlet [312a]; and wherein the vent is connected with the second junction [316'].

Certain embodiments of the present application relate to mobile agricultural equipment [100] comprising the system [100'] of claim [0027], wherein the mobile agricultural equipment [100] further comprises a first vehicle comprising: a plurality of row units [210]; the holding tank [300], wherein the holding tank is connected with the plurality of row units [210]; and the system [100']; and wherein each of the row units is configured to distribute agricultural product from the holding tank to ground.

In certain embodiments, the mobile agricultural equipment further comprises a second vehicle connected with the first vehicle [200]; wherein the second vehicle comprises a reservoir of agricultural product [390]; and wherein the conveyance device [121, 123] is configured to blow agricultural product from the reservoir toward the supply line [310].

In certain embodiments, the mobile agricultural equipment further comprises a plurality of distribution outlets [320], each distribution outlet leading from the holding tank to a corresponding row unit of the plurality of row units [210].

DETAILED DESCRIPTION OF ILLUSTRATIVE EMBODIMENTS

Figure 1:
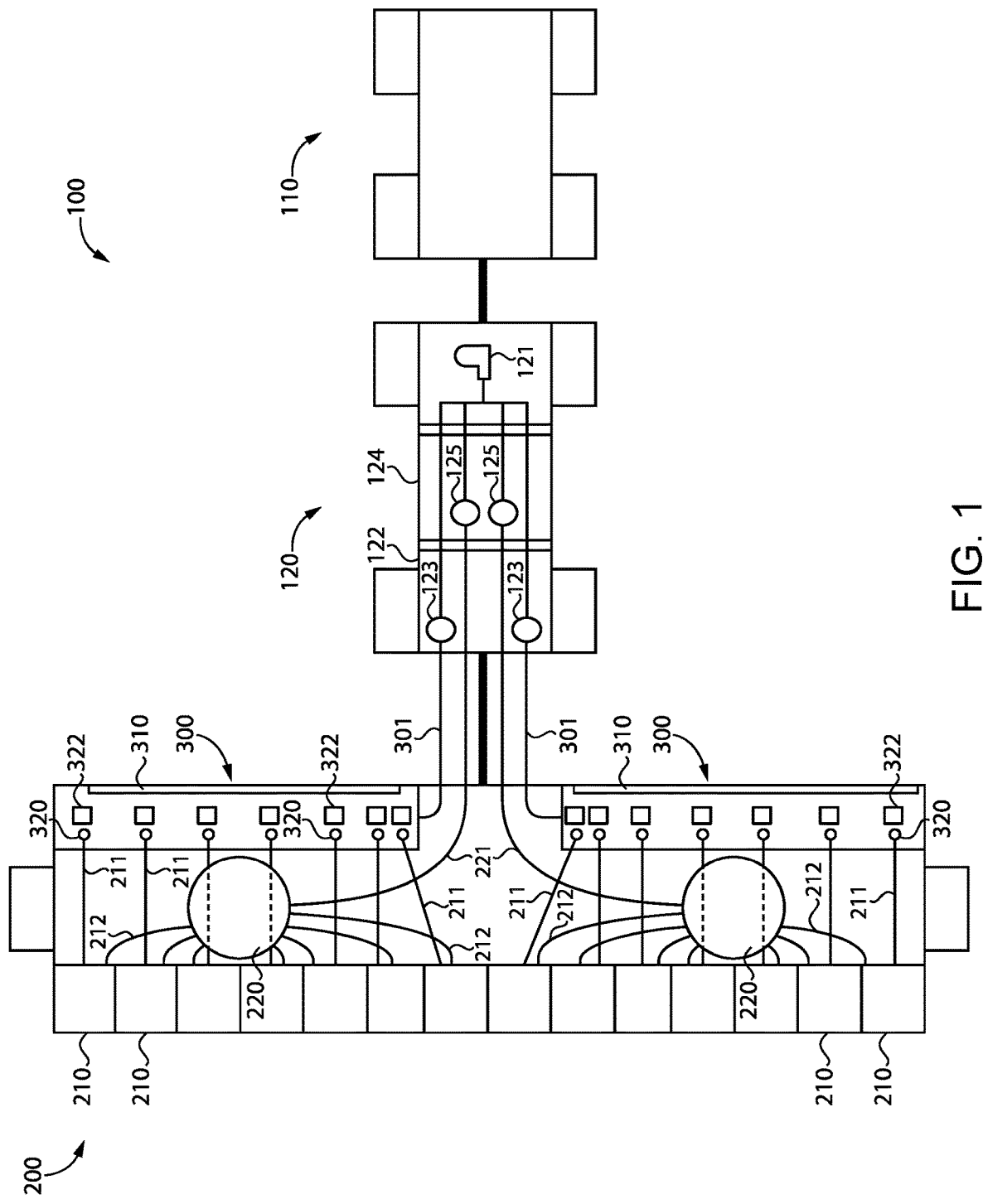
FIG. 1 is a schematic representation of mobile agricultural equipment according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is mobile agricultural equipment 100 according to certain embodiments. The mobile agricultural equipment 100 generally includes a towing vehicle 110, which tows a commodity cart 120 and a distribution trailer 200 according to certain embodiments. As described herein, the equipment 100 is configured to distribute granular agricultural product across a plot of land.

The towing vehicle 110 provides motive power for the equipment 100, and may, for example, be provided in the form of a tractor or another towing vehicle. In certain forms, the towing vehicle 110 may provide electrical and/or mechanical power to the other components of the equipment, for example via a power take-off.

The commodity cart 120 is towed by the towing vehicle 110, and stores agricultural product for distribution by the distribution trailer 200. The commodity cart 120 includes at least one reservoir in which agricultural product is stored, and in the illustrated form includes a plurality of reservoirs, including a first reservoir 122 and a second reservoir 124. The first reservoir 122 holds a first granular agricultural product (e.g., fertilizer), and the second reservoir 124 holds a second granular agricultural product (e.g., seed). In the illustrated form, the commodity cart 120 further includes at least one first meter 123, and may further include at least one second meter 125. As described herein, the at least one first meter 123 facilitates the transportation of the first agricultural product to one or more holding tanks 300 of the distribution trailer 200, and the at least one second meter 125 facilitates transportation of the second agricultural product to at least one distribution tower 220 of the distribution trailer 200. The commodity cart 120 may further include a least one blower 121 that facilitates transportation of the first and second agricultural products to the distribution trailer 200 via separate material conveyance conduits 221, 301. In certain embodiments, the blower 121 and/or the meter 123 may be considered to constitute a conveyance device.

The illustrated distribution trailer 200 generally includes a plurality of row units 210 configured to place agricultural product in or on the ground, and in the illustrated form further includes at least one distribution tower 220 configured to distribute the second agricultural product to the plurality of row units 210. As described herein, the distribution trailer 200 further includes one or more holding tanks 300 configured to hold the first agricultural product for distribution to the row units 210.

Each row unit 210 is connected with a corresponding one of the holding tanks 300 via a corresponding first feed line 211, through which the first agricultural product is transported to the row unit 210. In the illustrated form, each row unit 210 is also connected with a corresponding one of the distribution towers 220 via a corresponding second feed line 212, through which the second agricultural product is transported to the row unit 210. The row units 210 may be of any type known in the art, and may, for example, include an opening wheel for opening a furrow in the ground, a first distribution mechanism for placing the first agricultural product in the furrow, a second distribution mechanism for placing the second agricultural product in the furrow, and a closing wheel for closing the furrow once the first and second agricultural products have been deposited therein. Alternatively, a shank may be utilized in place of a rolling element to facilitate closure of the furrow.

Each distribution tower 220 is connected with the second reservoir 124 via a corresponding first distribution line 221 such that the second agricultural product is pneumatically conveyed to the distribution tower 220 by operation of the blower(s) 121 and the second meter(s) 125. The distribution tower 220 is configured to apportion the incoming agricultural product to the various row units 210 by directing the agricultural product to the several second feed lines 212.

Figure 2:
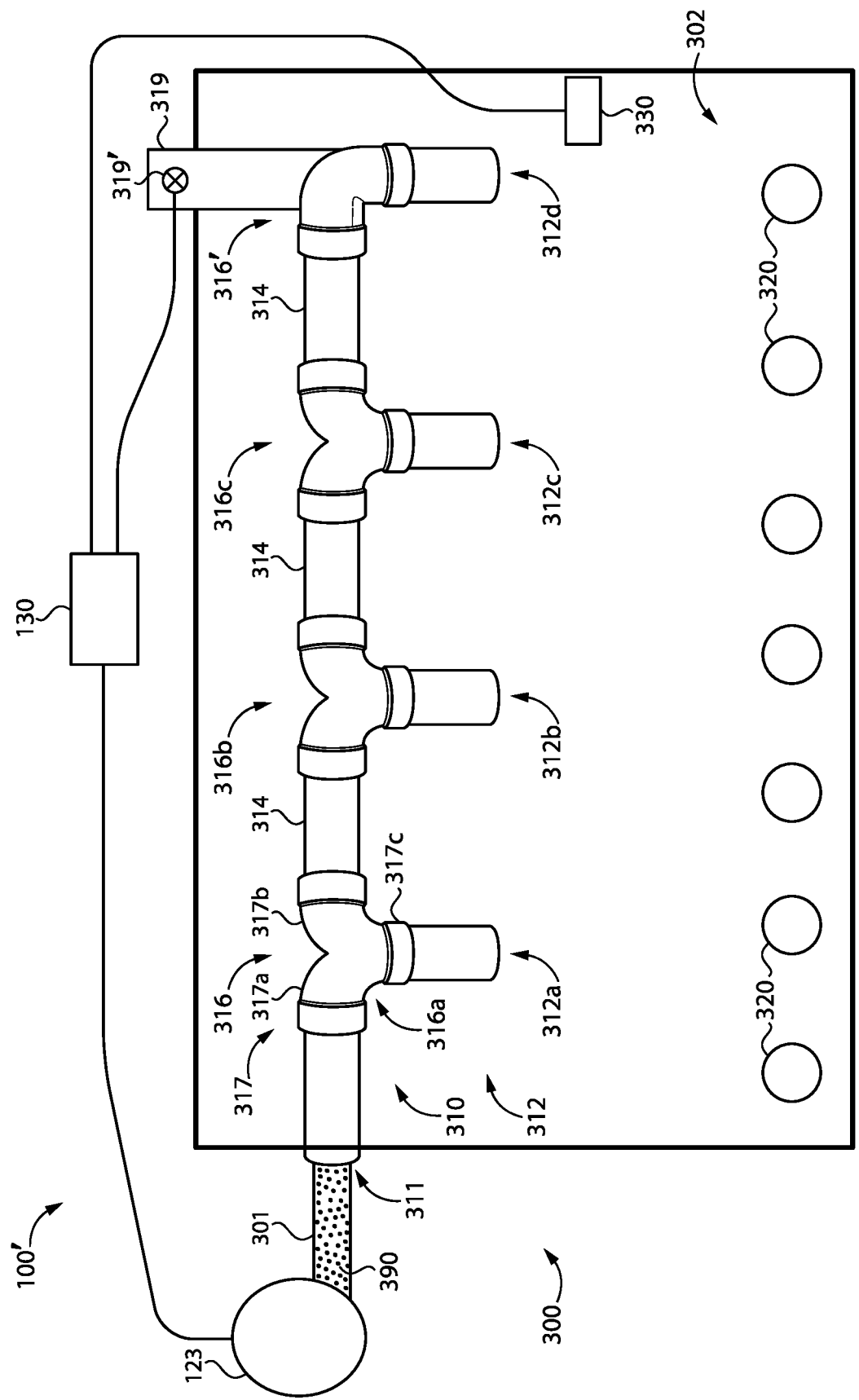
FIG. 2 is a schematic representation of a holding tank according to certain embodiments.

With additional reference to FIG. 2, each holding tank 300 is connected to the first reservoir 122 via a corresponding distribution line 301 such that the first agricultural product 390 is pneumatically conveyed to the holding tank 300 by operation of the blower(s) 121 and the first meter(s) 123. Extending through an upper region of the holding tank 300 is a supply line 310, an inlet 311 of which is connected with the distribution line 301 such that agricultural product 390 is operable to flow through the supply line 310 by the blower 121. Positioned below the supply line 310 are a plurality of outlets 320, each of which is connected with a corresponding one of the first feed lines 211 such that agricultural product 390 flows to the various row units 210 by operation of one or more delivery devices 322, such as volumetric meters and/or commodity system venturis. Also positioned within the holding tank 300 is a fill sensor 330, the function of which is described in further detail herein.

The supply line 310 generally includes a supply line inlet 311 connected to the distribution line 301, a plurality of supply line outlets 312 open to the interior of the tank 300, a plurality of tubes 314 that are connected with one another via junctions 316, 316', and a vent 319 positioned at or near a distal end of the supply line 310. The plurality of supply line outlets 312 includes a first supply line outlet 312a and a final supply line outlet 312d, and in the illustrated form includes a pair of intermediate supply line outlets 312b, 312c. In the illustrated form, the outlets 312 are arranged relatively linearly. It is also contemplated that the outlets 312 need not be in-line with one another, and may, for example, be provided in the geometry of a circle, a square, or another shape, and may be distributed with even spacing between the outlets 312 and/or with uneven spacing between the outlets 312.

The first supply line outlet 312a is nearest the supply line inlet 311, and the final supply line outlet 312d is farthest from the supply line inlet 311 (as measured along the supply line 310). In other words, the first outlet 312a is upstream of the final outlet 312d such that the distance traveled by agricultural product 390 flowing from the inlet 311 to the first outlet 312a is less than the distance traveled by agricultural product 390 flowing from the inlet 311 to the final outlet 312d.

In the illustrated form, the supply line 310 includes a number of junctions 316, 316' corresponding to the number of supply line outlets 312. More particularly, the illustrated supply line 310 includes three first junctions 316 corresponding to the first three supply line outlets 312a, 312b, 312c, and a second junction 316' corresponding to the final supply line outlet 312d. More particularly, the first junctions 316 are provided in the form of Y-shaped junctions, and the second junction 316' is provided in the form of an elbow or L-shaped junction. It is also contemplated that one or more of the junctions 316, 316' may be provided in another form. For example, the second junction 316' may be provided in the form of a T-shaped junction or a Y-shaped junction, one outlet branch of which may lead to the vent 319.

Each first junction 316 includes three branches 317, including a upper inlet branch 317a, an upper outlet branch 317b, and a lower outlet branch 317c extending downward from the upper branches 317a, 317b. In each first junction 316, the upper inlet branch 317a is positioned upstream of lower outlet branch 317c, which is positioned upstream of the upper outlet branch 317b. The lower outlet branch 317c leads to one of the supply line outlets 312, and the upper outlet branch 317b leads to the next junction 316, 316'. As described in further detail below, at least a portion of the agricultural product 390 flowing through the first junction will be directed toward the lower outlet branch 317c until the corresponding supply line outlet 312 is blocked, at which point the amount of agricultural product 390 flowing through the upper outlet branch 317b will increase such that product flows to the next junction 316, 316'.

In the illustrated form, the second junction 316' is provided in the form of an elbow or L-junction, and is connected with the vent 319. It is also contemplated that the second junction 316' may take another form, such as that of a Y-shaped junction or a T-shaped junction, in which one branch is open to the vent 319. In order to prevent agricultural product 390 from flowing out of the vent 319, an inlet of the vent 319 may be provided with a screen or other component that permits air to flow therethrough while blocking the passage of agricultural product 390.

Certain embodiments of the present application relate to a system 100' for filling the holding tank 300. As used herein, the term "filling" indicates that the agricultural product 390 is flowing into the tank 300, and does not require that the tank 300 be fully filled. In the illustrated form, the system 100' includes the blower 121, the meter 123, a controller 130, the supply line 310, and the sensor 330, and may further include the vent 319. Further details regarding the operation of the system 100' are provided herein.

Figure 3:
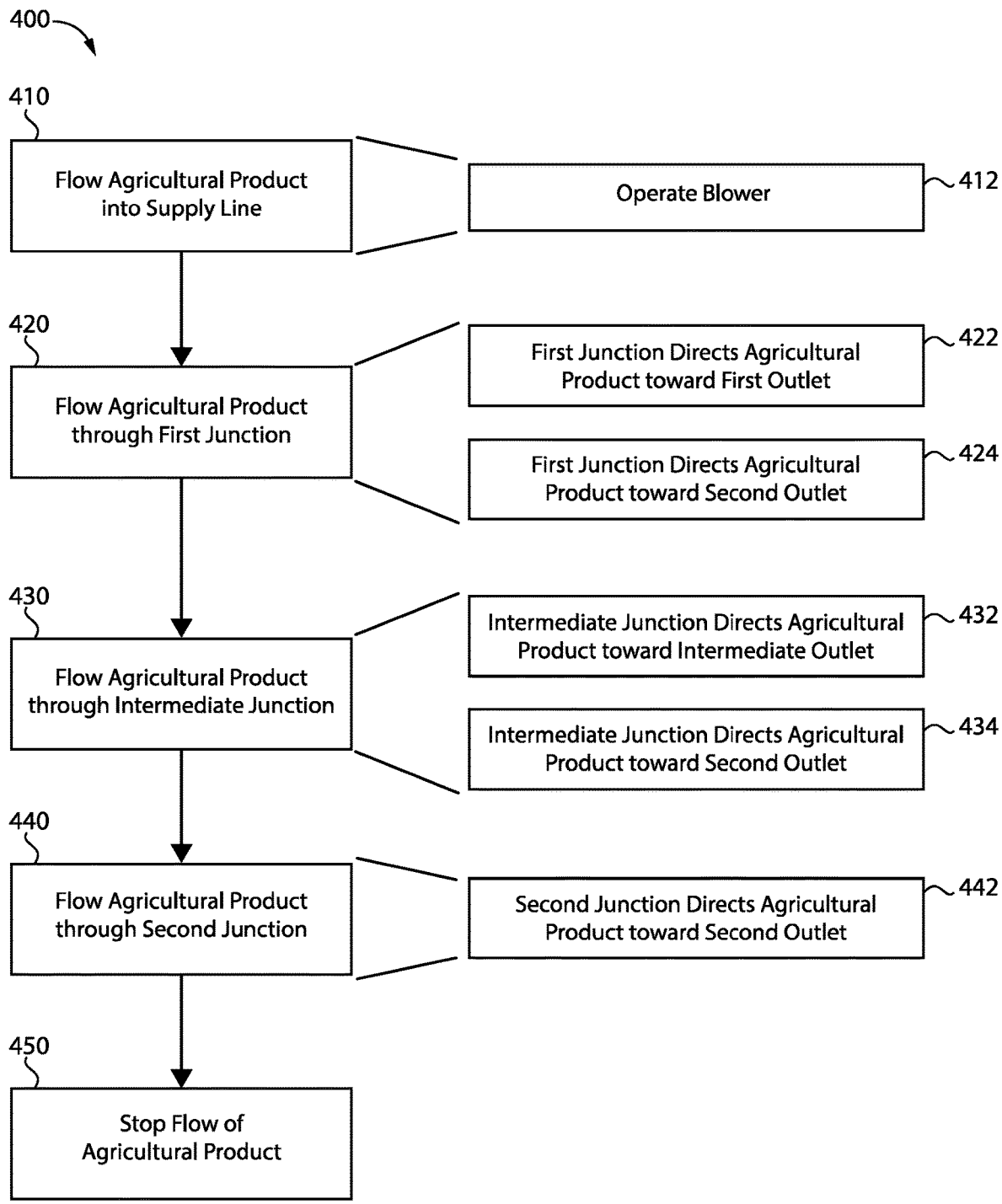
FIG. 3 is a schematic flow diagram of a process according to certain embodiments.

With additional reference to FIG. 3, an exemplary process 400 that may be performed using the mobile agricultural equipment 100, the system 100', and/or the holding tank 300 is illustrated. Blocks illustrated for the processes in the present application are understood to be examples only, and blocks may be combined or divided, and added or removed, as well as re-ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 400 is described herein with specific reference to the mobile agricultural equipment 100, the system 100', and the holding tank 300 illustrated in FIGS. 1 and 2, it is to be appreciated that the process 400 may be performed with mobile agricultural equipment, systems, and/or holding tanks having additional and/or alternative features.

The process 400 generally involves filling a holding tank, such as the holding tank 300 illustrated in FIGS. 1 and 2. The process 400 may begin with block 410, which generally involves flowing agricultural product 390 into a supply line including a plurality of outlets open to a holding space of the holding tank. For example, block 410 may involve flowing agricultural product 390 into the supply line 310, which includes outlets 312 open to the holding space 302 of the holding tank 300. The plurality of outlets 312 may include a first outlet 312a associated with a first junction 316a and a second outlet 312d associated with a second junction 316'. In certain embodiments, block 410 may involve block 412, which generally involves operating a blower 121 and/or a meter 123 to thereby flow agricultural product 390 from a reservoir 122 into the supply line 310.

Figure 4:
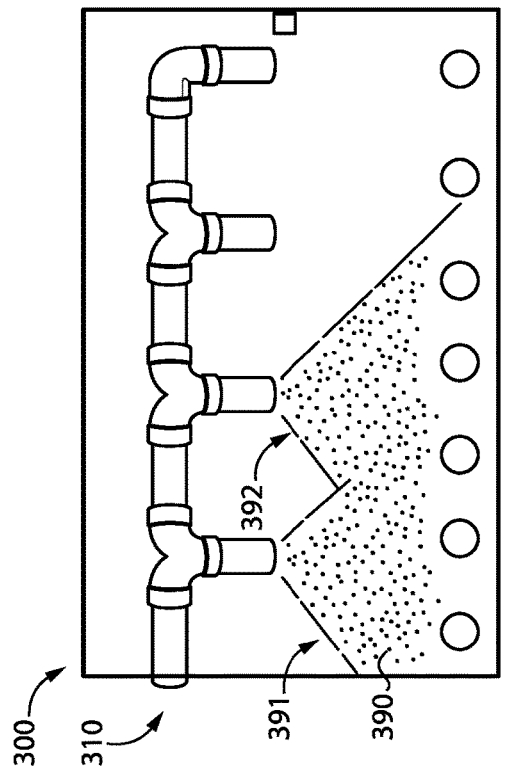
FIGS. 4-7 illustrate the holding tank illustrated in FIG. 2 at various stages of the process illustrated in FIG. 3.
Figure 5:
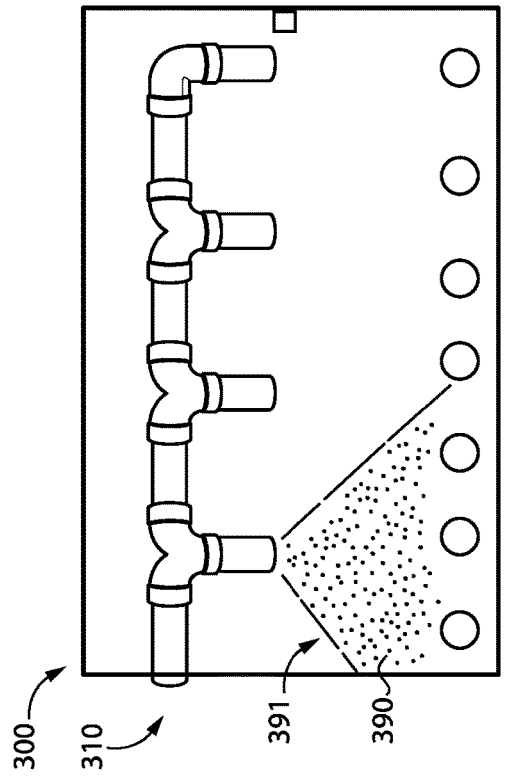

With additional reference to FIGS. 4-7, the process 400 includes block 420, which generally involves flowing agricultural product 390 through the first junction. For example, block 420 may involve flowing agricultural product 390 through the first junction 316a, which is associated with the first outlet 312a. During block 420, the first junction 316a directs agricultural product 390 to flow out of the first outlet 312a to thereby form a first pile 391 of agricultural product 390 (FIG. 4). More particularly, the first junction 316a directs agricultural product 390 to flow out of the first outlet 312a until the first outlet 312a becomes blocked (e.g., by the first pile 391) as illustrated at block 422, and thereafter directs agricultural product 390 to flow toward the second junction 316', as illustrated at block 424.

In certain embodiments, the plurality of outlets 312 may include one or more intermediate outlets 312b, 312c positioned between the first outlet 312a and the second outlet 312d. Each such intermediate outlet 312b, 312c may be associated with a corresponding and respective junction 316b, 316c. The first junction 316a and/or one or more of the intermediate outlet(s) 316b, 316c may be provided in the form of Y-shaped junctions, as described above.

Figure 6:
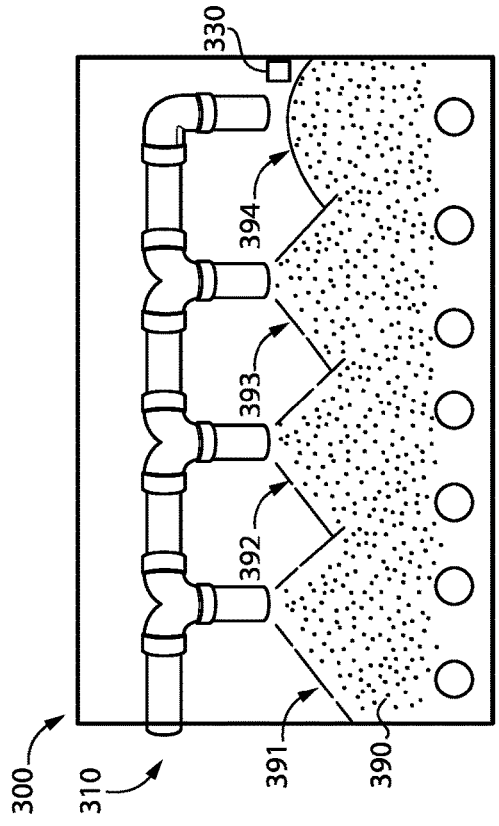
Figure 7:
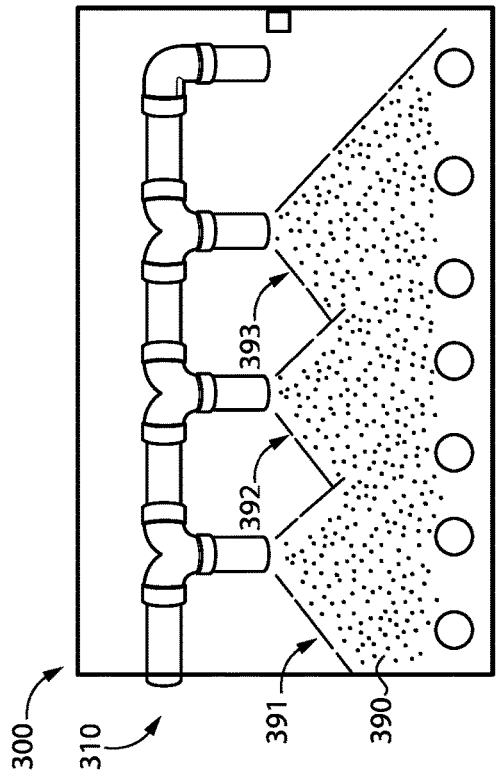

In embodiments in which the plurality of outlets 312 includes at least one intermediate outlet, the process 400 may include block 430, which generally involves flowing the agricultural product 390 through an intermediate outlet. For example, block 430 may involve causing agricultural product 390 to flow out of the second outlet 312b to thereby form a second pile 392 of agricultural product 390 (FIG. 5), wherein the second junction 316b directs agricultural product 390 to flow out of the second outlet 312b until the second outlet 312b becomes blocked (e.g., by the second pile 392) as illustrated at block 432, and thereafter directs agricultural product 390 to flow toward the second junction 316' as illustrated at block 434. Block 430 may then be iterated for each sequential intermediate outlet, for example to form a third pile 393 (FIG. 6).

The process 400 may further include block 440, which generally involves flowing agricultural product through the second junction. Block 440 may include block 442, which generally involves the second junction 316' directing agricultural product toward the second outlet 312d, thereby forming a final pile 394.

The process 400 may further include block 450, which generally involves stopping the flow of agricultural product 390, for example by ceasing operation of the meter 123. Block 450 may, for example, be performed in response to the fill sensor 330 indicating that the final pile 394 has reached a predetermined height. The fill sensor 330 may, for example, comprise an optical sensor or switch, a mechanical sensor or switch, or another type of sensor or switch by which the controller 130 is operable to determine when the final pile 394 has reached a predetermined height. It is also contemplated that the fill sensor 330 may take another form. As one example, the fill sensor may be provided as a load sensor that is positioned below the final pile 394. In such forms, the controller 130 may determine that the fill height has been reached based upon the load sensed by the load sensor.

While FIGS. 4-7 illustrate agricultural product 390 exiting the outlets 312 purely sequentially, it should be appreciated that some agricultural product 390 may flow through two or more of the outlets 312 simultaneously. For example, during block 420, which generally involves flowing agricultural product 390 through the first outlet 312a until the first outlet 312a becomes blocked, some agricultural product 390 may flow through the upper outlet branch 317b of the first junction 316a and on toward the second junction 316b. In certain embodiments, the first junctions 316 are configured such that agricultural product 390 flows at least primarily out of the first outlet 312a until the first outlet 312a becomes blocked, and thereafter directs agricultural product 390 to flow toward the second junction 316'.

Figure 8:
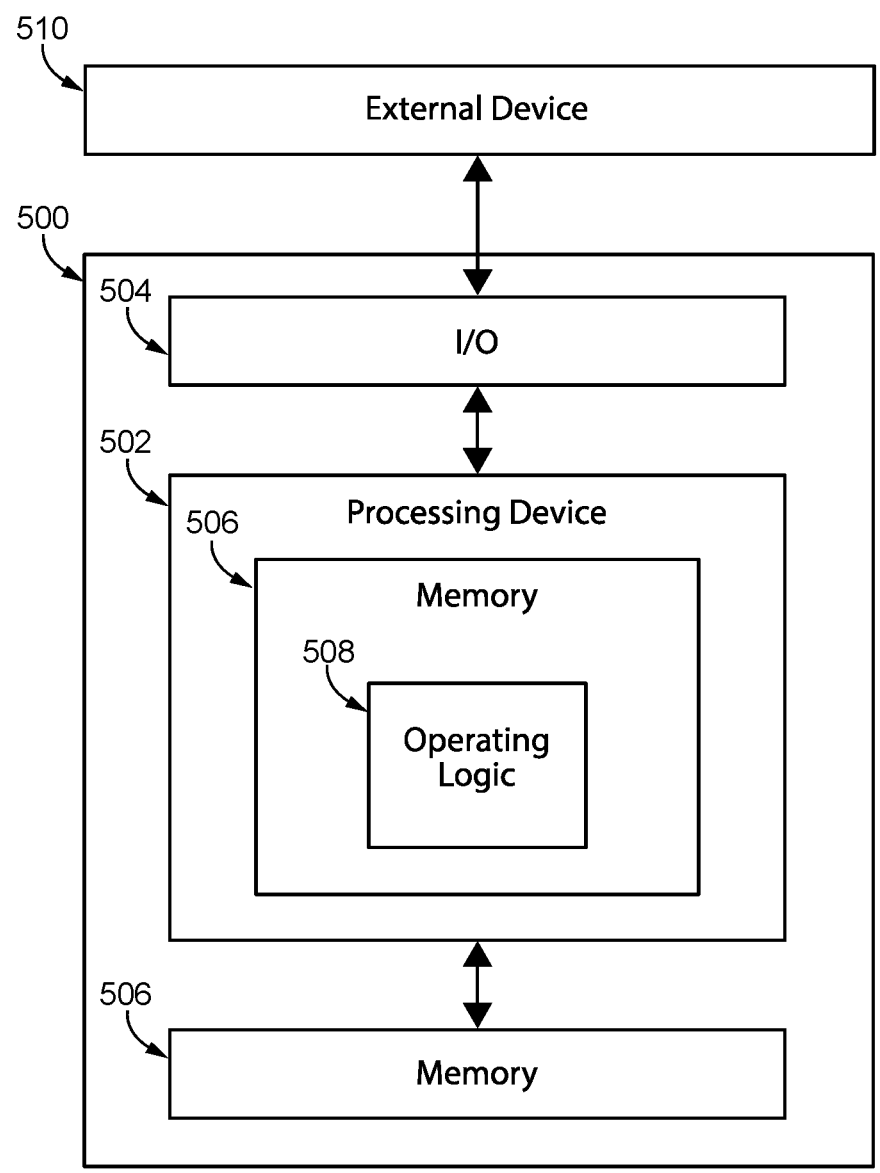
FIG. 8 is a schematic block diagram of a computing device that may be utilized in connection with certain embodiments.

Referring now to FIG. 8, a simplified block diagram of at least one embodiment of a computing device 500 is shown. The illustrative computing device 500 depicts at least one embodiment of a controller that may be utilized in connection with the controller 130 illustrated in FIG. 2.

Depending on the particular embodiment, the computing device 500 may be embodied as a server, desktop computer, laptop computer, tablet computer, notebook, netbook, Ultrabook™ mobile computing device, cellular phone, smartphone, wearable computing device, personal digital assistant, Internet of Things (IoT) device, vehicle controller, control panel, processing system, router, gateway, and/or any other computing, processing, and/or communication device capable of performing the functions described herein.

The computing device 500 includes a processing device 502 that executes algorithms and/or processes data in accordance with operating logic 508, an input/output device 504 that enables communication between the computing device 500 and one or more external devices 510, and memory 506 which stores, for example, data received from the external device 510 via the input/output device 504.

The input/output device 504 allows the computing device 500 to communicate with the external device 510. For example, the input/output device 504 may include a transceiver, a network adapter, a network card, an interface, one or more communication ports (e.g., a USB port, serial port, parallel port, an analog port, a digital port, VGA, DVI, HDMI, FireWire, CAT or any other type of communication port or interface), and/or other communication circuitry. Communication circuitry may be configured to use any one or more communication technologies (e.g., wireless or wired communications) and associated protocols (e.g., Ethernet, Bluetooth®, Bluetooth Low Energy (BLE), Wi-Fi®, WiMAX, etc.) to effect such communication depending on the particular computing device 500. The input/output device 504 may include hardware, software, and/or firmware suitable for performing the techniques described herein.

The external device 510 may be any type of device that allows data to be inputted or outputted from the computing device 500. For example, in various embodiments, the external device 510 may be embodied as the blower 121, the meter 123, the meter 125, the valve 319', the blower 322, and/or the fill sensor 330. Further, in some embodiments, the external device 510 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 510 may be integrated into the computing device 500.

The processing device 502 may be embodied as any type of processor(s) capable of performing the functions described herein. In particular, the processing device 502 may be embodied as one or more single or multi-core processors, microcontrollers, or other processor or processing/controlling circuits. For example, in some embodiments, the processing device 502 may include or be embodied as an arithmetic logic unit (ALU), central processing unit (CPU), digital signal processor (DSP), and/or another suitable processor(s). The processing device 502 may be a programmable type, a dedicated hardwired state machine, or a combination thereof. Processing devices 502 with multiple processing units may utilize distributed, pipelined, and/or parallel processing in various embodiments. Further, the processing device 502 may be dedicated to performance of just the operations described herein, or may be utilized in one or more additional applications. In the illustrative embodiment, the processing device 502 is of a programmable variety that executes algorithms and/or processes data in accordance with operating logic 508 as defined by programming instructions (such as software or firmware) stored in memory 506. Additionally or alternatively, the operating logic 508 for processing device 502 may be at least partially defined by hardwired logic or other hardware. Further, the processing device 502 may include one or more components of any type suitable to process the signals received from input/output device 504 or from other components or devices and to provide desired output signals. Such components may include digital circuitry, analog circuitry, or a combination thereof.

The memory 506 may be of one or more types of non-transitory computer-readable media, such as a solid-state memory, electromagnetic memory, optical memory, or a combination thereof. Furthermore, the memory 506 may be volatile and/or nonvolatile and, in some embodiments, some or all of the memory 506 may be of a portable variety, such as a disk, tape, memory stick, cartridge, and/or other suitable portable memory. In operation, the memory 506 may store various data and software used during operation of the computing device 500 such as operating systems, applications, programs, libraries, and drivers. It should be appreciated that the memory 506 may store data that is manipulated by the operating logic 508 of processing device 502, such as, for example, data representative of signals received from and/or sent to the input/output device 504 in addition to or in lieu of storing programming instructions defining operating logic 508. As illustrated, the memory 506 may be included with the processing device 502 and/or coupled to the processing device 502 depending on the particular embodiment. For example, in some embodiments, the processing device 502, the memory 506, and/or other components of the computing device 500 may form a portion of a system-on-a-chip (SoC) and be incorporated on a single integrated circuit chip.

In some embodiments, various components of the computing device 500 (e.g., the processing device 502 and the memory 506) may be communicatively coupled via an input/output subsystem, which may be embodied as circuitry and/or components to facilitate input/output operations with the processing device 502, the memory 506, and other components of the computing device 500. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 500 may include other or additional components, such as those commonly found in a typical computing device (e.g., various input/output devices and/or other components), in other embodiments. It should be further appreciated that one or more of the components of the computing device 500 described herein may be distributed across multiple computing devices. In other words, the techniques described herein may be employed by a computing system that includes one or more computing devices. Additionally, although only a single processing device 502, I/O device 504, and memory 506 are illustratively shown in FIG. 8, it should be appreciated that a particular computing device 500 may include multiple processing devices 502, I/O devices 504, and/or memories 506 in other embodiments. Further, in some embodiments, more than one external device 510 may be in communication with the computing device 500.

It should be appreciated that the systems and methods described herein may provide one or more advantages over existing techniques. For example, certain existing techniques require that a user stand within the holding tank and manually level the agricultural product during filling. By contrast, certain embodiments of the present application distribute the agricultural product 390 relatively evenly throughout the holding tank 390, thereby obviating the need for manual or machine-controlled leveling. Such embodiments may facilitate the filling of a holding tank during movement of the agricultural equipment. For example, the systems and methods described herein may facilitate the filling of the holding tank 300 of the second towed vehicle 200 from the reservoir 122 of the first towed vehicle 120 during operation of the mobile agricultural equipment 100.

Certain embodiments of the present application involve levelly filling a holding tank whose length is greater than its height and/or its width, which may facilitate that use of holding tanks that are more conducive to compact folding of mobile agricultural equipment on which the holding tank is carried. As noted above, the level fill of a holding tank may be particularly useful in embodiments in which agricultural product is carried from plural outlets 320 to row units for distribution to the ground, as a non-level fill may result in the row units 210 exhausting the available supply of agricultural product at different times. In certain embodiments, the supply line 310 may achieve these and/or other advantages without requiring that the supply line 310 be provided with moving parts (e.g., valves at the junctions), which may provide for a more robust and/or reliable filling system.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of filling a holding tank with agricultural product, the method comprising:

flowing agricultural product into a supply line comprising a plurality of outlets open to a holding space of the holding tank, the plurality of outlets including a first outlet associated with a first junction, and a second outlet associated with a second junction;

flowing agricultural product through the first junction, wherein agricultural product flowing out of the first outlet forms a first pile, wherein the first junction directs agricultural product to flow out of the first outlet until the first outlet becomes blocked, and thereafter directs agricultural product to flow toward the second junction, and wherein agricultural product flowing out of the second outlet forms a second pile;

with the first outlet blocked, flowing agricultural product through the first junction toward the second junction, wherein the second junction directs agricultural product to flow out of the second outlet; and
stopping flow of agricultural product in response to the second pile reaching a predetermined height.

2. The method of claim 1, wherein the first outlet is upstream of the second outlet.

3. The method of claim 1, wherein the first junction is a Y-shaped junction.

4. The method of claim 3, wherein the Y-shaped junction comprises:
an inlet branch;
a first outlet branch leading toward the first outlet; and
a second outlet branch leading toward the second junction;
wherein the inlet branch is angled and/or curved toward the first outlet branch.

5. The method of claim 1, wherein the plurality of outlets further comprises an intermediate outlet positioned between the first outlet and the second outlet;
wherein the intermediate outlet is associated with an intermediate junction;
wherein flowing agricultural product through the first junction toward the second junction comprises flowing agricultural product through the intermediate junction; and
wherein the intermediate junction directs agricultural product to flow out of the intermediate outlet until the intermediate outlet becomes blocked, and thereafter directs agricultural product to flow toward the second junction.

6. The method of claim 1, wherein the plurality of outlets further comprises a final outlet positioned downstream of the second outlet;
wherein the final outlet is associated with a final junction; and
wherein the second junction directs agricultural product to flow out of the second outlet until the second outlet becomes blocked, and thereafter directs agricultural product to flow toward the final junction.

7. The method of claim 1, wherein the second outlet is a final outlet of the supply line.

8. A system for filling a holding tank with agricultural product, the system comprising:
a supply line comprising:
an inlet connected with a conveyance device such that the supply line is operable to receive a flowing agricultural product conveyed by the conveyance device;
a plurality of outlets open to a holding space of the holding tank, the plurality of outlets comprising a first outlet and a second outlet; and
a plurality of junctions, each junction associated with a corresponding outlet of the plurality of outlets, the plurality of junctions comprising a first junction associated with the first outlet, and a second junction associated with the second outlet;
a sensor configured to sense when a pile of agricultural product below the second outlet reaches a predetermined height; and
a controller in communication with the sensor and the conveyance device, wherein the controller is configured to cease operation of the conveyance device based upon information generated by the sensor;
wherein the first junction is configured to direct agricultural product to flow out of the first outlet until the first outlet becomes blocked, and to thereafter direct agricultural product to flow toward the second junction; and
wherein the second junction is configured to direct agricultural product to flow out of the second outlet.

9. The system of claim 8, further comprising the conveyance device, wherein the conveyance device comprises a blower and/or a meter.

10. The system of claim 8, wherein the first junction is a Y-shaped junction.

11. The system of claim 10, wherein the Y-shaped junction comprises an inlet branch, a first outlet branch leading toward the first outlet, and a second outlet branch leading toward the second junction; and
wherein the inlet branch is configured to direct agricultural product toward the first outlet branch until the first outlet becomes blocked.

12. The system of claim 8, further comprising a vent positioned downstream of the first outlet.

13. The system of claim 12, wherein the vent is connected with the second junction.

14. Mobile agricultural equipment comprising the system of claim 8.

15. The mobile agricultural equipment of claim 14, wherein the mobile agricultural equipment further comprises a first vehicle comprising:
a plurality of row units;
the holding tank, wherein the holding tank is connected with the plurality of row units; and
the system; and
wherein each of the row units is configured to distribute agricultural product from the holding tank to ground.

16. Mobile agricultural equipment, comprising:
a first vehicle, comprising a supply line, a plurality of row units, a holding tank connected with the plurality of row units, and a supply line;
a second vehicle connected with the first vehicle, wherein the second vehicle comprises a reservoir of agricultural product; and
a conveyance device configured to convey agricultural product from the reservoir toward the supply line;
wherein the supply line comprises:
an inlet connected with the conveyance device such that the supply line is operable to receive flowing agricultural product conveyed by the conveyance device;
a plurality of outlets open to a holding space of the holding tank, the plurality of outlets comprising a first outlet and a second outlet; and
a plurality of junctions, each junction associated with a corresponding outlet of the plurality of outlets, the plurality of junctions comprising a first junction associated with the first outlet, and a second junction associated with the second outlet;
wherein the first junction is configured to direct agricultural product to flow out of the first outlet until the first outlet becomes blocked, and to thereafter direct agricultural product to flow toward the second junction; and
wherein the second junction is configured to direct agricultural product to flow out of the second outlet.

17. The mobile agricultural equipment of claim 15, further comprising a plurality of distribution outlets, wherein each distribution outlet leads from the holding tank to a corresponding row unit of the plurality of row units.

18. The method of claim 1, further comprising determining the second pile has reached the predetermined height based on information generated by a sensor;
   wherein stopping the flow of agricultural product in response to the second pile reaching the predetermined height comprises wherein stopping the flow of agricultural product in response to determining the second pile has reached the predetermined height based on information generated by the sensor.

19. The method of claim 18, wherein flowing agricultural product into the supply line comprises operating a conveyance device; and
   wherein stopping the flow of agricultural product comprises ceasing operation of the conveyance device.

* * * * *